(12) United States Patent
Leng et al.

(10) Patent No.: US 12,344,146 B2
(45) Date of Patent: Jul. 1, 2025

(54) VEHICLE SEAT

(71) Applicant: Bayerische Motoren Werke Aktiengesellschaft, Munich (DE)

(72) Inventors: Michael Leng, Geltendorf (DE); Mathias Schmidt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 135 days.

(21) Appl. No.: 18/038,760

(22) PCT Filed: Dec. 9, 2021

(86) PCT No.: PCT/EP2021/085046
§ 371 (c)(1),
(2) Date: May 25, 2023

(87) PCT Pub. No.: WO2022/128742
PCT Pub. Date: Jun. 23, 2022

(65) Prior Publication Data
US 2023/0406186 A1  Dec. 21, 2023

(30) Foreign Application Priority Data

Dec. 15, 2020  (DE) ............... 10 2020 133 562.8

(51) Int. Cl.
*B60N 2/897* (2018.01)
*B60N 2/826* (2018.01)
*B60N 2/838* (2018.01)

(52) U.S. Cl.
CPC ............ *B60N 2/897* (2018.02); *B60N 2/826* (2018.02); *B60N 2/838* (2018.02); *B60N 2205/20* (2013.01)

(58) Field of Classification Search
None
See application file for complete search history.

(56) References Cited

U.S. PATENT DOCUMENTS

| 3,650,561 | A  | 3/1972 | Faust et al. |
| 4,844,544 | A  | 7/1989 | Ochiai |
| 7,717,517 | B2 | 5/2010 | Yamane et al. |

(Continued)

FOREIGN PATENT DOCUMENTS

| DE | 29 27 702 A1 | 1/1981 |
| DE | 80 27 412 U1 | 2/1981 |

(Continued)

OTHER PUBLICATIONS

International Search Report (PCT/ISA/210) issued in PCT Application No. PCT/EP2021/085046 dated Mar. 17, 2022 with English translation (5 pages).

(Continued)

*Primary Examiner* — Anthony D Barfield
(74) *Attorney, Agent, or Firm* — Crowell & Moring LLP

(57) ABSTRACT

A vehicle seat has a seat bottom, a backrest which is attached to the seat bottom and has a backrest structure, and a headrest attached to the backrest. The headrest has a headrest structure provided with an upholstery cover and inserted by way of at least one support rod in an associated support rod holder of the backrest structure and being locked or lockable there. At least one damping element is provided between the backrest structure and the headrest structure.

5 Claims, 1 Drawing Sheet

(56) References Cited

U.S. PATENT DOCUMENTS

| | | | |
|---|---|---|---|
| 2016/0368403 A1* | 12/2016 | Kobayashi | B60N 2/80 |
| 2023/0071448 A1* | 3/2023 | Bivens | B60N 2/809 |

FOREIGN PATENT DOCUMENTS

| | | |
|---|---|---|
| DE | 10 2009 042 663 A1 | 3/2011 |
| DE | 10 2013 224 965 A1 | 6/2014 |
| DE | 10 2016 005 091 A1 | 9/2016 |
| EP | 2 447 113 A1 | 5/2012 |
| EP | 3307586 A1 | 4/2018 |
| FR | 2 982 545 A1 | 5/2013 |
| GB | 2511599 A | 9/2014 |
| JP | 2010-268970 A | 12/2010 |
| WO | WO 2016/198692 A1 | 12/2016 |

OTHER PUBLICATIONS

German-language Written Opinion (PCT/ISA/237) issued in PCT Application No. PCT/EP2021/085046 dated Mar. 17, 2022 (6 pages).

German-language Search Report issued in German Application No. 10 2020 133 562.8 dated Aug. 6, 2021 with partial English translation (10 pages).

Chinese-language Office Action issued in Chinese Application No. 202180073980.6 dated Apr. 25, 2025 with English translation (7 pages).

* cited by examiner

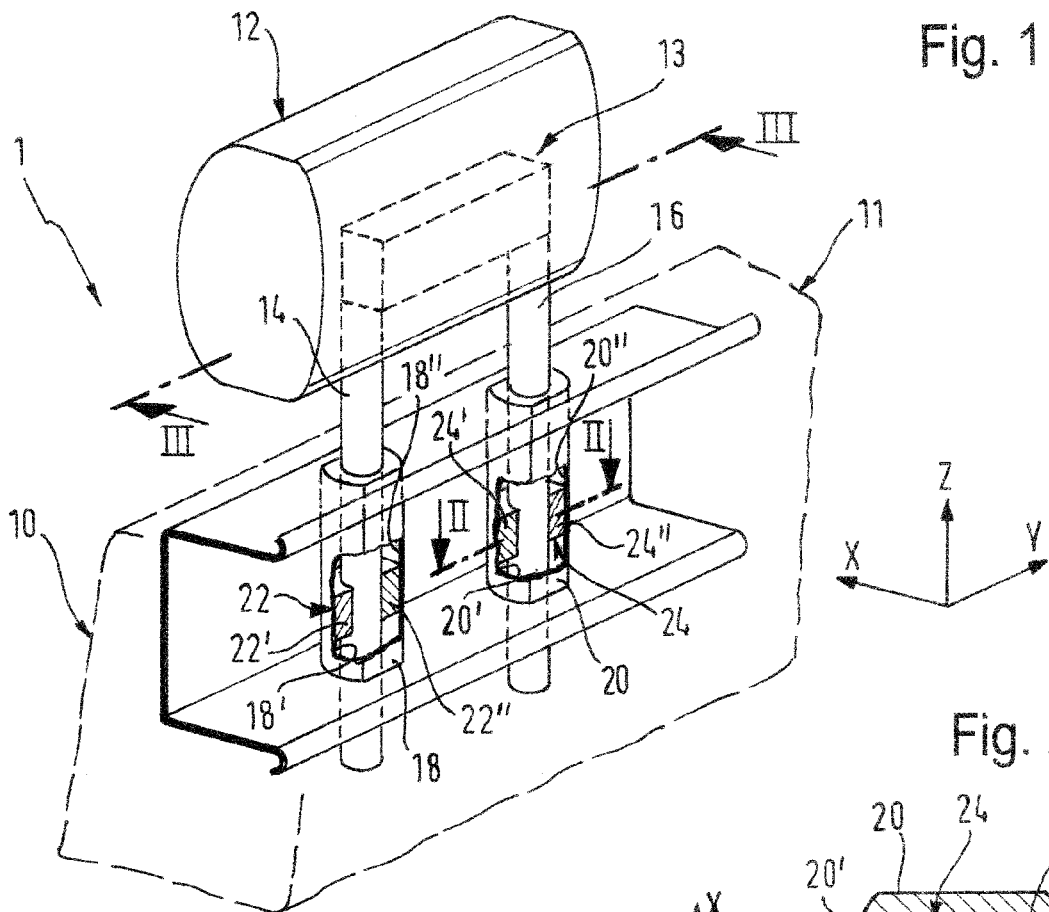
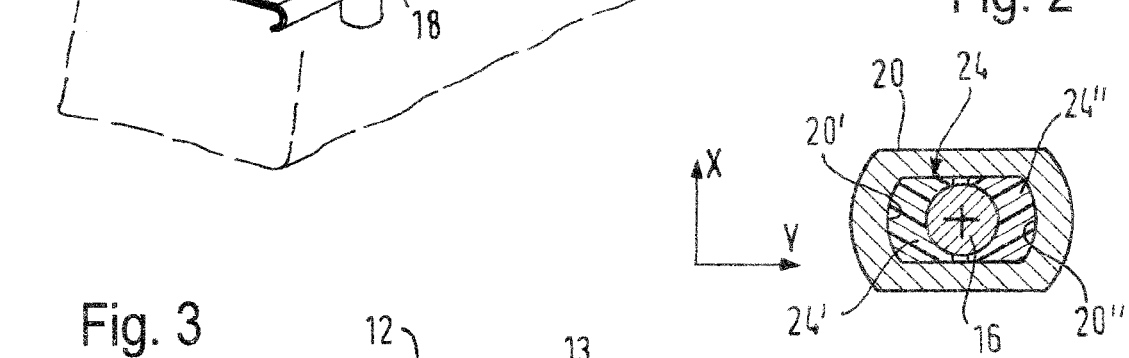
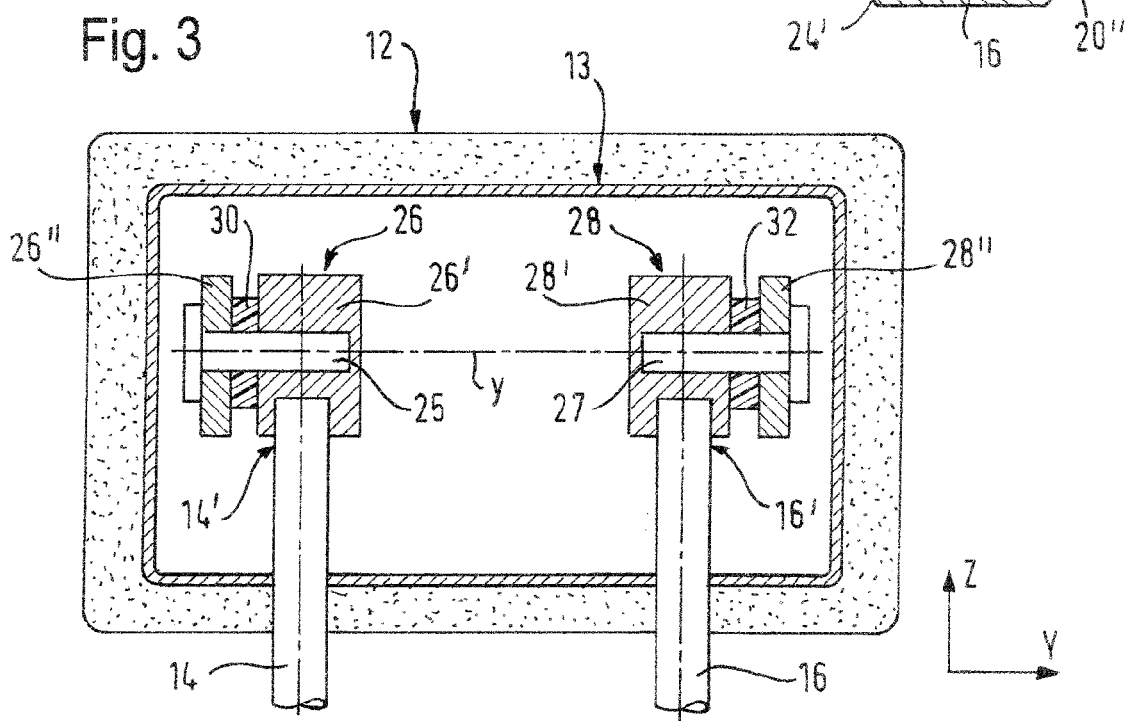

VEHICLE SEAT

TECHNICAL FIELD

The invention relates to a vehicle seat. The invention further relates to a vehicle, in particular a motor vehicle, having at least one such vehicle seat.

BACKGROUND AND SUMMARY

The natural frequency of vehicle seats often lies in the range of excitation caused by the vehicle and leads to discomfort for a passenger seated on the vehicle seat due to lateral vibration. This vibration of the seat is amplified by additional special equipment in the upper backrest region, for example by active headrests or by screens integrated in the headrests or in the upper backrest region, so that during the operation of the vehicle the headrests of such vehicle seats perform clearly visible and noticeable lateral vibrations which negatively impairs the impression of quality of a vehicle.

The vibrations of the backrest which occur are generally reduced by complex and cost-intensive vibration absorbers which are provided in the interior of the backrest.

It is the object of the present invention to improve a generic vehicle seat such that both the seating comfort is enhanced and the visual impression of quality is improved when the vehicle is moving.

This object is achieved by the features of the independent claims.

In a vehicle seat comprising a seat bottom, a backrest which is attached to the seat bottom and which has a backrest structure and a headrest attached to the backrest, the headrest has a headrest structure provided with an upholstery cover, and is inserted by means of at least one support rod in an associated support rod holder of the backrest structure and is received so as to be locked or lockable there. According to the invention, it is provided that at least one damping element is provided between the backrest structure and the headrest structure.

The provision of the at least one damping element between the backrest structure and the headrest structure decouples the headrest from the backrest structure in terms of vibrations and dampens the vibrations and resonances which occur in the backrest relative to the anchoring of the headrest in the backrest.

Further preferred and advantageous design features of the vehicle seat according to the invention form the subject matter of the dependent claims.

Preferably, the at least one damping element is formed from an elastic material or comprises such an elastic material. The material is particularly preferably an elastomer, such as for example (natural or synthetic) rubber or silicone.

According to a first variant of the invention, which can be combined with other variants, the at least one damping element is provided between the at least one support rod and the associated support rod holder. The damping element is integrated in the headrest holder in the backrest.

It is advantageous here if the damping element extends in the seat transverse direction so as to provide a damping action with a first lateral damping portion and with a second lateral damping portion, starting from the associated at least one support rod toward one respective lateral guide surface which is configured in the interior of the support rod holder, and if the at least one support rod bears against the front inner wall region or against the rear inner wall region of the associated support rod holder substantially without a significant interposition of damping material in the seat longitudinal direction. This embodiment permits a damping of vibrations and oscillations which occur in the seat transverse direction (i.e. in the vehicle transverse direction) without impairing the direct supporting action of the at least one support rod in the associated support rod holder in the seat longitudinal direction (i.e. in the vehicle longitudinal direction), as is required in the case of a vehicle collision. An insignificant interposition in the above sense can consist, for example, of a skin of the elastic damping material which has a thickness of only a few, for example one to two, tenths of a millimeter, and which connects the two lateral damping portions together.

In a further embodiment of the invention, the at least one damping element is provided between the at least one support rod and the headrest structure. In this second variant of the invention, which can also be combined with the first variant, the at least one damping element is provided in the interior of the headrest.

It is advantageous here if the upper end portion of the at least one support rod, which is respectively located in the interior of the headrest, is provided with a tilting joint of the headrest which has a hinge bolt, wherein a fixed first bearing element is fixedly connected to the support rod, and if a second bearing element of the headrest structure is mounted on the hinge bolt, which determines a transverse axis, so as to be tiltable about the transverse axis, wherein the at least one damping element is provided in the transverse direction between the fixed first bearing element and the pivotable second bearing element, the damping element preferably surrounding the hinge bolt. In this variant, vibrations and resonances occurring in the seat transverse direction are also effectively damped without the supporting action of the headrest fastening being impaired in the seat longitudinal direction.

Finally, the invention also relates to a vehicle, in particular a motor vehicle, having at least one vehicle seat configured according to the invention.

Preferred exemplary embodiments of the invention, together with additional design details and further advantages, are described and explained in more detail below with reference to the accompanying drawings.

BRIEF DESCRIPTION OF THE DRAWINGS

FIG. 1 is a partial sectional perspective view of a backrest of a vehicle seat according to an embodiment of the invention obliquely from the rear;

FIG. 2 is a horizontal section view through a headrest holder of a first variant of the invention along the line II-II; and FIG. 3 is a vertical section view through a headrest of a second variant of the invention along the line III-III.

DETAILED DESCRIPTION OF THE DRAWINGS

FIG. 1 shows in a perspective rear view the backrest 10 of a vehicle seat 1 of a vehicle (not shown). A headrest 12 is attached to the upper end of the backrest 10 by means of two support rods 14, 16 which are connected to a headrest structure 13 in the interior of the headrest 12. The support rods 14, 16 are inserted into respective support rod holders 18, 20 and are fastened in a height-adjustable manner therein (in the Z-direction of the backrest). The support rod holders 18, 20 are fixedly connected, for example welded, to a backrest structure 11 of the backrest.

As can be identified in FIGS. 1 and 2, at least one damping element 22, 24 is arranged between one respective support rod 14, 16 and the support rod holder 18, 20 associated therewith. The respective damping element 22, 24 extends in the seat transverse direction Y so as to provide a damping action with a first damping portion 22', 24' and with a second damping portion 22", 24", starting from the associated support rod 14, 16, toward one respective lateral guide surface 18', 18" or 20', 20" which is configured in the interior of the respective support rod holder 18, 20. The respective support rod 14, 16 bears substantially directly against the front inner wall region and against the rear inner wall region of the associated support rod holder 18, 20 in the seat longitudinal direction X. In this manner, the elasticity of the respective damping element 22, 24 acts in a vibration-damping manner in the seat transverse direction Y, while an effective and direct support of longitudinal forces occurring in the X-direction from the headrest structure 13 into the backrest structure 11 is ensured in the seat longitudinal direction X, for example in the case of a front collision or in the case of a rear impact.

FIG. 3 shows a further variant for damping transverse vibrations, which can be provided individually or together with the variant of FIG. 2 in a vehicle seat. The respective support rod 14, 16 is fixedly connected at its upper end portion 14', 16', which is located in the interior of the headrest 12, in each case to a first bearing element 26', 28' of a tilting joint 26, 28 for tilting the headrest 12 about a transverse axis y. Each of the tilting joints 26, 28 has a hinge bolt 25, 27, a second bearing element 26", 28" which is connected to the headrest structure 13 being mounted thereby so as to be tiltable about the transverse axis y. In each case, an annular damping element 30, 32 which surrounds the respective hinge bolt 25, 27 is provided between the first bearing element 26', 28' attached to the respective support rod 14, 16 and the associated pivotable second bearing element 26", 28" which is connected to the headrest structure 13, the damping element in each case bearing against the first bearing element 26', 28' and the second bearing element 26", 28". These damping elements 30, 32 also have a vibration-damping action in the transverse direction Y.

The invention is not limited to the above exemplary embodiments which merely serve for the general explanation of the basic idea of the invention. Rather, the device according to the invention can also adopt different embodiments from those described above within the scope of protection. The device can have, in particular, features which represent a combination of the respective individual features of the claims.

Reference signs in the claims, the description and the drawings serve merely for improved understanding of the invention and are not intended to limit the scope of protection.

LIST OF REFERENCE SIGNS

1 Vehicle seat
10 Backrest
11 Backrest structure
12 Headrest
13 Headrest structure
14 Support rod
16 Support rod
18 Support rod holder
18' Guide surface
18" Guide surface
20 Support rod holder
20' Guide surface
20" Guide surface
22 Damping element
22' Damping portion
22" Damping portion
24 Damping element
24' Damping portion
24" Damping portion
25 Hinge bolt
26 Tilting joint
26' Bearing element
26" Bearing element
27 Hinge bolt
28 Tilting joint
28' Bearing element
28" Bearing element
30 Damping element
32 Damping element
X Seat longitudinal direction
Y Seat transverse direction

The invention claimed is:

1. A vehicle seat, comprising:
a seat bottom;
a backrest which is attached to the seat bottom and has a backrest structure;
a headrest attached to the backrest, the headrest having a headrest structure provided with an upholstery cover;
at least one support rod for the headrest, the at least one support rod being inserted in an associated support rod holder of the backrest structure and being locked or lockable therein;
at least one damping element provided between the backrest structure and the headrest structure, the damping element being formed from an elastic material or comprising the elastic material, wherein
the at least one damping element is provided with a damping action between the at least one support rod and the associated support rod holder in a transverse direction of the vehicle seat;
the at least one damping element extends in the transverse direction so as to provide a damping action with a first damping portion and with a second damping portion, starting from the associated at least one support rod to one respective lateral guide surface which is configured in an interior of the support rod holder, and
the at least one support rod bears against a front inner wall region or against a rear inner wall region of the associated support rod holder substantially without a significant interposition of damping material in a seat longitudinal direction.

2. The vehicle seat according to claim 1, wherein:
an upper end portion of the at least one support rod, which is respectively located in an interior of the headrest, is provided with a tilting joint of the headrest which has a hinge bolt, wherein a fixed first bearing element is fixedly connected to the associated support rod,
a second bearing element of the headrest structure is mounted on the respective hinge bolt, which determines a transverse axis, so as to be tiltable about the transverse axis, and
the at least one damping element is formed from an elastic material or comprises the elastic material and is provided with a damping action in the transverse direction between the fixed first bearing element and the pivotable second bearing element.

3. The vehicle seat according to claim 2, wherein the at least one damping element surrounds the associated hinge bolt.

4. A vehicle comprising at least one vehicle seat according to claim 1.

5. A vehicle comprising at least one vehicle seat according to claim 2.

\* \* \* \* \*